(12) United States Patent
Braun et al.

(10) Patent No.: US 6,171,621 B1
(45) Date of Patent: Jan. 9, 2001

(54) METHOD FOR MANUFACTURING A FOOD BASED ON A PROTEIN HYDROLYSATE

(75) Inventors: Marcel Braun, Konolfingen; Roland Schaedeli, Murten, both of (CH)

(73) Assignee: Nestec S.A., Vevey (CH)

( * ) Notice: Under 35 U.S.C. 154(b), the term of this patent shall be extended for 0 days.

(21) Appl. No.: 09/208,456

(22) Filed: Dec. 10, 1998

(30) Foreign Application Priority Data

Dec. 12, 1997 (EP) .................................................. 97203917

(51) Int. Cl.[7] ....................................................... A23B 4/22
(52) U.S. Cl. .................................. 426/8; 426/42; 426/52; 426/63
(58) Field of Search .................................... 426/8, 32, 34, 426/42, 44, 52, 56, 63, 106, 656, 657, 392, 399

(56) References Cited

U.S. PATENT DOCUMENTS

| | | | |
|---|---|---|---|
| 4,810,506 | 3/1989 | Lewis et al. | 426/28 |
| 4,981,704 | 1/1991 | Thibault | 426/41 |
| 5,039,532 | 8/1991 | Jost et al. | 426/41 |
| 5,618,689 | 4/1997 | McCarthy et al. | 435/68.1 |

FOREIGN PATENT DOCUMENTS

| | | |
|---|---|---|
| 0 322 589 | 7/1989 | (EP) . |
| 0 744 132 A2 | 5/1996 | (EP) . |
| 51-035461 | 3/1976 | (JP) . |
| 2007932 | 2/1994 | (RO) . |
| WO 85/04556 | 10/1985 | (WO) . |

*Primary Examiner*—Keith Hendricks
(74) *Attorney, Agent, or Firm*—Pennie & Edmonds LLP

(57) ABSTRACT

A liquid food based on a protein hydrolysate and a method for manufacturing the liquid food. The food is manufactured by preparing a solution of a starting material containing proteins, adjusting the pH of the solution, sterilizing the solution, aseptically adding to the solution a proteolytic enzyme in an amount which is sufficient to produce the desired degree of hydrolysis, aseptically packaging the sterilized solution, and allowing the solution and enzyme to effect hydrolysis after packaging.

20 Claims, No Drawings

METHOD FOR MANUFACTURING A FOOD BASED ON A PROTEIN HYDROLYSATE

TECHNICAL FIELD

The invention relates to the field of liquid protein hydrolysates and hypoallergenic infant formula containing protein hydrolysates in liquid form.

BACKGROUND ART

A method for preparing a milk protein hydrolysate is known, for example, from U.S. Pat. No. 5,039,532 according to which a lactoserum product is hydrolyzed enzymatically, in a batchwise or semi-continuous manner, in two hydrolysis steps separated by a heat treatment step. At the end of the second hydrolysis step, the enzyme is inactivated by a final heat treatment, which promotes its self-digestion.

According to another method, described for example in U.S. Pat. No. 4,981,704, a partial hydrolysate of lactoserum proteins is prepared by enzymatic hydrolysis and, after heat treatment, the enzymes and unhydrolyzed residual proteins are separated by ultra-filtration and the hydrolysate is collected as a permeate containing the desired peptides and amino acids.

In these known methods, an excess of the enzyme is used, which must then be removed. Enzymes are very expensive and the severe heat treatments needed to inactivate the enzyme results in a deterioration of product quality in the form of impaired coloration or taste, instability of emulsions present therein, or decreased nutritional value. Thus, a new method which avoids these problems is needed.

SUMMARY OF THE INVENTION

The present invention now provides a method for preparing a food product based on a protein hydrolysate, which is both cost-effective and which does not result in any deterioration of the organoleptic or nutritional qualities of the products.

The method relates to the manufacture of a liquid food based on a protein hydrolysate, in which a protein-containing starting material, which may contain unhydrolyzed or partially hydrolyzed protein, is dissolved in a liquid to form a solution of protein-containing starting material, the proteins are hydrolyzed enzymatically, and the solution of protein-containing starting material is sterilized and packaged aseptically. Advantageously, the pH of the solution of protein containing starting material is adjusted to a value of between 3 and 9 by addition of a base or acid before or after sterilization. When the pH is adjusted after the sterilization a sterilized base or acid is used. Preferably a proteolytic enzyme is added aseptically to the protein-containing starting material in an amount which is sufficient to produce the desired degree of hydrolysis of the proteins contained therein. Also, the mixture can be packaged aseptically while hot in packages which are hermetically sealed, with the packaged mixture being left to stand so as to effect hydrolysis in the package. The invention also relates to a liquid food based on a protein hydrolysate obtained by this method.

DETAILED DESCRIPTION OF THE PREFERRED EMBODIMENT

To carry out the present method, it is possible to commence with any solution of starting material containing proteins of plant or animal origin. Proteins of plant origin are preferably proteins from cereals and from legumes, for example from soybean or rice. Animal protein material is preferably a whey from cheesemaking, most preferably a sweet whey such as that resulting from the coagulation of casein with rennet, an acidic whey derived from the coagulation of casein with an acid or with acidifying bacteria, or alternatively a mixed whey resulting from a coagulation with acid and rennet.

The whey may be in the form of a whey protein concentrate which has been more or less freed of lactose. Preferably the whey protein concentrate which has been more or less freed of lactose is obtained by ultra-filtration and, where appropriate, followed by diafiltration.

The whey or whey protein concentrate can be a whey or whey protein concentrate which has been more or less demineralized. Preferably the whey or a whey protein concentrate is demineralized by ion-exchange, electrodialysis, or electrodeionization or by a combination of these methods. Skimmed milk or a caseinate can also be used.

The above protein sources can be in aqueous solution form or in powder form. With powder forms the solution of protein-containing starting material is obtained by reconstituting the powders. A solution of protein-containing starting material can also be obtained from a mixture of the above proteins and, where appropriate, lactose. In this case, the powder is dissolved in water, preferably demineralized water, so as to form an aqueous solution.

The solution of starting material may contain unhydrolyzed or partially hydrolyzed proteins. In the latter case, it may have undergone a partial enzymatic hydrolysis with a mixture of proteolytic enzymes or with a purified proteolytic enzyme, which are active in the basic and neutral ranges, in particular trypsin, chymotrypsin or pancreatin. This partial hydrolysis can be carried out for a relatively short period, preferably from 1 to a few hours with a small amount of enzyme, corresponding, for example, to about 0.01–0.1% by weight, based on the amount of the protein substrate (calculated as N×6.38).

After the constituents of the starting material have been dissolved in water, preferably deionized water, the solution is preheated, fats and an emulsifier are added thereto, the mixture is homogenized, and carbohydrates, minerals, vitamins and trace elements are added thereto.

According to one embodiment of the method, the solution of protein-containing starting material contains unhydrolyzed protein, the solution of protein-containing starting material is heat treated by an ultra-high temperature process ("UHT"), it is cooled by flash depressurization and homogenized aseptically. An aqueous enzyme solution sterilized by microfiltration is then added thereto and the sterile mixture is stored in a sterile buffer tank. In this buffer tank, the pH of the mixture is adjusted to about 8 by addition of an aqueous base solution which has been sterilized separately. Alternatively, the sterilized enzyme solution can be added to the buffer tank before the homogenized solution of protein-containing starting material is added.

According to another embodiment of the method, the solution of protein-containing starting material contains partially hydrolyzed protein and the pH of the solution of protein-containing starting material is adjusted to a value of greater than 7 prior to the UHT heat treatment. The subsequent operations of cooling by flash depressurization, aseptic homogenization, addition of a sterilized enzyme solution and storage in a sterile buffer tank are carried out as indicated above, except for the fact that the adjustment of the pH in the buffer tank can be omitted.

The additions of the enzyme and of base can also take place by continuously flowing a sterilized liquid mixture of the enzyme or base directly into the solution of protein-containing starting material.

A protease can be used as the enzyme. This protease, which acts in the neutral to alkaline range, can be of microbial or animal origin, for example of porcine or bovine origin. It is preferably trypsin, chymotrypsin, a mixture of trypsin and chymotrypsin, or pancreatin. It can be in crude form or in purified form. Preferably in purified form with no residual lipase or phospholipase A2 activity, the purified form being obtained by the method which is disclosed in U.S. patent application Ser. No. 09/135,436, filed Aug. 17, 1998. Commercial trypsin is preferably used, in a proportion of 0.01–0.2% by weight, based on the amount of the protein substrate (calculated as N×6.38).

In the subsequent step, packages, for example of the brick or metal-can type, are filled aseptically and hermetically sealed. Filling can take place at a temperature ranging from room temperature to about 80–90° C. and preferably at about 30–65° C. If it is desired to carry out only partial hydrolysis, the method can be performed at room temperature. The filled packages are then maintained at about 55–65° C. for a period ranging from about two hours to one week, so as to effect the hydrolysis to the point of equilibrium, consuming all of the enzyme. To this end, a thermostatically-regulated room can be used, for example. Alternatively, an advantageous way of carrying out this step can be, to group the packages in cartons and place them on pallets which are over-wrapped with a sheet of plastic. Needless to say, the filled packages can be stored at room temperature if a partial hydrolysis is desired.

EXAMPLES

The following preferred but non-limiting examples illustrate the method of the invention. In these examples, the parts and percentages are by weight, except where otherwise indicated.

Example 1

A mixture containing 85% sweet whey powder demineralized to about 50%, 10% skimmed milk powder and 5% potassium caseinate was dissolved in 90 parts of deionized water and the pH of the solution was adjusted to 6.6 using an aqueous citric acid solution.

After preheating the solution to 75° C., a mixture of lipids composed of palm oil, soybean oil, coconut oil, grape-seed oil, fish oil and egg lecithin, which had been preheated to 70° C., was added thereto.

The resulting mixture was homogenized in two stages at 200 bar, then at 50 bar, after which it was heated at 90° C. for 5 min. and cooled to 15° C. Maltodextrin, a premix of trace elements and a premix of vitamins and mineral salts were added to the emulsion, such that the solids content was about 12.5%.

The above emulsion was sterilized at 148° C. for 5 sec. by UHT and was then cooled to 70° C. by flash depressurization. After homogenization under sterile conditions in two stages, first at 250 bar and then at 50 bar, it was cooled to 20° C.

Separately, a 1% solution of commercial trypsin containing about 25% trypsin (PTN 6.0 S, Novo) in deionized water, at a pH of 3, was prepared and sterilized by passage through a double-membrane filter having a 0.45 micron membrane followed by a 0.2 micron membrane. The resulting solution was added in line into the emulsion and the resulting mixture stored in a sterile buffer tank. The pH of the mixture was adjusted to 8 by addition of aqueous potassium hydroxide solution which had been vapor-sterilized beforehand, and then cooled. The amount of commercial trypsin in the liquid is about 25 ppm (parts per million).

Sterile cans at 60–65° C. were aseptically filled with the mixture and hermetically sealed. The sealed containers were grouped in cartons, the cartons placed in pallets under a thermoplastic film and the cartons stored at 55–65° C. for 3 days.

After this period, it was observed that when the containers were cooled to room temperature, there was no longer any hydrolysis which could be detected by measuring the pH, the latter being stabilized at about 6.8. When the residual proteins in the product were analyzed by zone electrophoresis on sodium dodecyl sulphate/polyacrylamide gel (SDS-PAGE method, very sensitive), no residual unhydrolyzed protein or protein fragments could be detected.

Furthermore, the color of the product was similar to that of products manufactured by the conventional methods, despite the fact that they had a markedly less bitter taste. In addition much fewer lysine molecules were blocked than in products manufactured by the conventional methods. There was no phase separation or sedimentation.

Example 2

The method was carried out as in Example 1, except the trypsin was purified according to the method disclosed in U.S. patent application Ser. No. 09/135,436, filed Aug. 17, 1998.

The quality of the product obtained was similar to that of the product prepared according to Example 1, apart from the additional improvement in quality due to the absence of residual phospholipase which is capable of degrading the lecithin contained in the products.

Examples 3–4

The method was carried out as in Example 1 (for Example 3) and as in Example 2 (for Example 4), except that the starting protein solution was composed of 10 parts of a protein mixture containing 82% sweet whey powder demineralized to about 80%, 18% acidic whey concentrate powder demineralized to 80%, and 90 parts of deionized water, and the pH of the solution was adjusted to 3.3 using aqueous citric acid, hydrochloric acid or phosphoric acid solution. The products obtained had the same qualities as those of Example 1 and Example 2, respectively.

Examples 5–6

The method was carried out as in Example 1 (for Example 5) and as in Example 2 (for Example 6), except that the starting protein solution was composed of 10 parts of a protein mixture containing 81% mild lactoserum powder demineralized to about 80%, 19% mild lactoserum concentrate powder demineralized to 80%, and 90 parts of deionized water, and the pH of the solution was adjusted to 6.9 using an aqueous citric acid solution. The products obtained had the same qualities as those of Example 1 and Example 2, respectively.

Example 7

A first hydrolysis was carried out on a mixture containing 85% sweet whey powder demineralized to about 50%, 10% skimmed milk powder, and 5% potassium caseinate in 90 parts of deionized water, the pH of which was adjusted to 8 by addition of an aqueous dispersion of Ca(OH)$_2$, in a jacketed reactor thermostatically adjusted to 55° C., for 5 hr. After the reaction, the pH of the medium was 7.4.

The solution was preheated to 75° C. and a mixture of lipids composed of palm oil, soybean oil, coconut oil, grape-seed oil, fish oil and egg lecithin, which had also been preheated to 70° C., was added thereto.

The resulting mixture was homogenized in two stages at 200 bar, then at 50 bar, after which it was heated at 90° C. for 5 min. and cooled to 15° C. Maltodextrin, a premix of trace elements and a premix of vitamins and mineral salts were added to the emulsion, such that the solids content was about 12.5%.

The above emulsion was sterilized at 148° C. for 5 sec. by UHT and then cooled to 70° C. by flash depressurization. After homogenization under sterile conditions in two stages, first at 250 bar and then at 50 bar, it was cooled to 20° C.

Separately, a 1% solution of commercial trypsin containing about 25% trypsin (PTN 6.0 S, Novo) in deionized water, of pH 3, was prepared and sterilized by passage through a double-membrane filter having a 0.45 micron membrane followed by a 0.2 micron membrane. The resulting solution was added in line into the emulsion and the resulting mixture was stored in a sterile buffer tank. The amount of commercial trypsin in the liquid is about 10 ppm (parts per million).

Sterile cans at 60–65°0 C. were aseptically filled with the emulsion and hermetically sealed. The sealed containers were grouped in cartons, the cartons placed in pallets under a thermoplastic film and the cartons stored at 55–65° C. for 3 days.

After this period, it was observed that when the containers were cooled to room temperature, there was no longer any hydrolysis which could be detected by measuring the pH, the latter being stabilized at about 6.8. When the residual proteins in the product were analyzed by zone electrophoresis on sodium dodecyl sulphate/polyacrylamide gel (SDS-PAGE method, very sensitive), no residual unhydrolyzed protein or protein fragments could be detected.

Furthermore, the color of the product was similar to that of products manufactured by the conventional methods, despite the fact that they had a markedly less bitter taste. In addition, much fewer lysine molecules were blocked than in products manufactured by the conventional methods. There was no phase separation or sedimentation.

Example 8

The method was carried out as in Example 7, except that the trypsin was purified according to the method disclosed in U.S. patent application Ser. No. 09/135,436, filed Aug. 17, 1998.

The quality of the product obtained was similar to those of the products prepared according to Example 1, apart from the additional improvement in quality due to the absence of residual phospholipase which is capable of degrading the lecithin contained in the products.

Examples 9–10

The method was carried out as in Example 7 (for Example 9) and as in Example 8 (for Example 10), except that the starting protein solution was composed of 10 parts of a protein mixture containing 82% sweet whey powder demineralized to about 80%, 18% acidic lactoserum concentrate powder demineralized to 80%, and 90 parts of deionized water. The products obtained had the same qualities as those of Example 7 and Example 8, respectively.

Examples 11–12

The method was carried out as in Example 7 (for Example 11) and as in Example 8 (for Example 12), except that the starting protein solution was composed of 10 parts of a protein mixture containing 81% sweet whey powder demineralized to about 80%, 19% sweet whey concentrate powder demineralized to 80%, and 90 parts of deionized water. The products obtained had the same qualities as those of Example 7 and Example 8, respectively.

What is claimed is:

1. A method for manufacturing a liquid food comprising:
   preparing a solution of a protein-containing starting material;
   adjusting an initial pH of the solution to a value of between about 3 and 9 by the addition of base or acid;
   sterilizing the solution of protein-containing starting material;
   aseptically adding to the solution a proteolytic enzyme in an amount of about 0.01–0.1% by weight based on the amount of protein material; and
   aseptically packaging the sterilized solution;
   wherein the enzyme hydrolyzes the solution to a point of equilibrium consuming all of the enzyme.

2. The method of claim 1, wherein the initial pH of the solution is adjusted to the range of about 6 and 9 by adding a sterilized base or acid after the liquid solution is sterilized.

3. The method of claim 1, wherein the solution of protein-containing starting material is prepared from plant proteins.

4. The method of claim 3, wherein the plant protein comprises a protein from a cereal, legume, soybean or rice.

5. The method of claim 1, wherein the solution of protein-containing starting material is prepared from animal proteins.

6. The method of claim 5, wherein the animal protein comprises a whey, skimmed milk or caseinate.

7. The method of claim 6, wherein the whey comprises a sweet whey, an acidic whey, or a mixed whey resulting from coagulation of casein with acid and rennet.

8. The method of claim 6, which further comprises providing the whey as a whey protein concentrate obtained by ultra-filtration and optionally diafiltration.

9. The method of claim 8, further comprising ultra filtration and, where appropriate, diafiltration of the whey protein concentrate.

10. The method of claim 6, which further comprises demineralizing the whey protein concentrate by ion-exchange, electrodialysis, electrodeionization or a combination thereof.

11. The method of claim 1, which further comprises preparing the solution of protein-containing starting material to include partially hydrolyzed proteins.

12. The method of claim 1, which further comprises preparing the solution of protein-containing starting material by dissolving the proteins in deionized water.

13. The method of claim 12, which further comprises preheating the solution of protein-containing starting material, adding fats and emulsifiers to the solution of protein-containing starting material, homogenizing the solution of protein-containing starting material and adding carbohydrates, minerals, vitamins and trace elements to the solution of protein-containing starting material.

14. The method of claim 1, which further comprises using unhydrolyzed protein as the starting material, heat-treating the solution of protein-containing starting material by an ultra-high temperature process, cooling the heat-treated solution by flash depressurization, aseptically homogenizing the cooled solution, adding an aqueous proteolytic enzyme solution sterilized by microfiltration to the homogenized solution, and adjusting the pH of the resulting solution to about 8 by the addition of a sterilized aqueous base.

15. The method of claim 1, which further comprises using partially hydrolyzed protein as the starting material, adjusting the pH of the solution of protein-containing starting material to a value greater than 7, heat-treating the solution by an ultrahigh temperature process, cooling the heat-treated solution by flash depressurization, aseptically homogenizing the cooled solution, adding an aqueous proteolytic enzyme solution sterilized by microfiltration to the cooled solution, and storing the resultant sterile solution.

16. The method of claim 1, wherein the enzyme is a protease which is active in the neutral to alkaline range.

17. The method of claim 16, wherein the protease is of microbial or animal origin.

18. The method of claim 16, wherein the protease comprises trypsin, chymotrypsin, a mixture of trypsin and chymotrypsin, or pancreatin.

19. The method of claim 18, which further comprises purifying the trypsin, chymotrypsin, mixture of trypsin and chymotrypsin, or pancreatin to a purified form that has no residual lipase or phospholipase A2 activity.

20. The method of claim 1, wherein the sterilized solution is aseptically packaged at a temperature ranging from room temperature to 65° C. and then allowed to stand at about 55–65° C. for a period ranging from about two hours to one week, so as to effect the hydrolysis to a point of equilibrium consuming all of the enzyme.

* * * * *